No. 700,786. Patented May 27, 1902.
A. L. KULL.
DRIVING MECHANISM FOR AUTOMOBILES.
(Application filed Apr. 2, 1901. Renewed Dec. 9, 1901.)
(No Model.) 2 Sheets—Sheet 1.
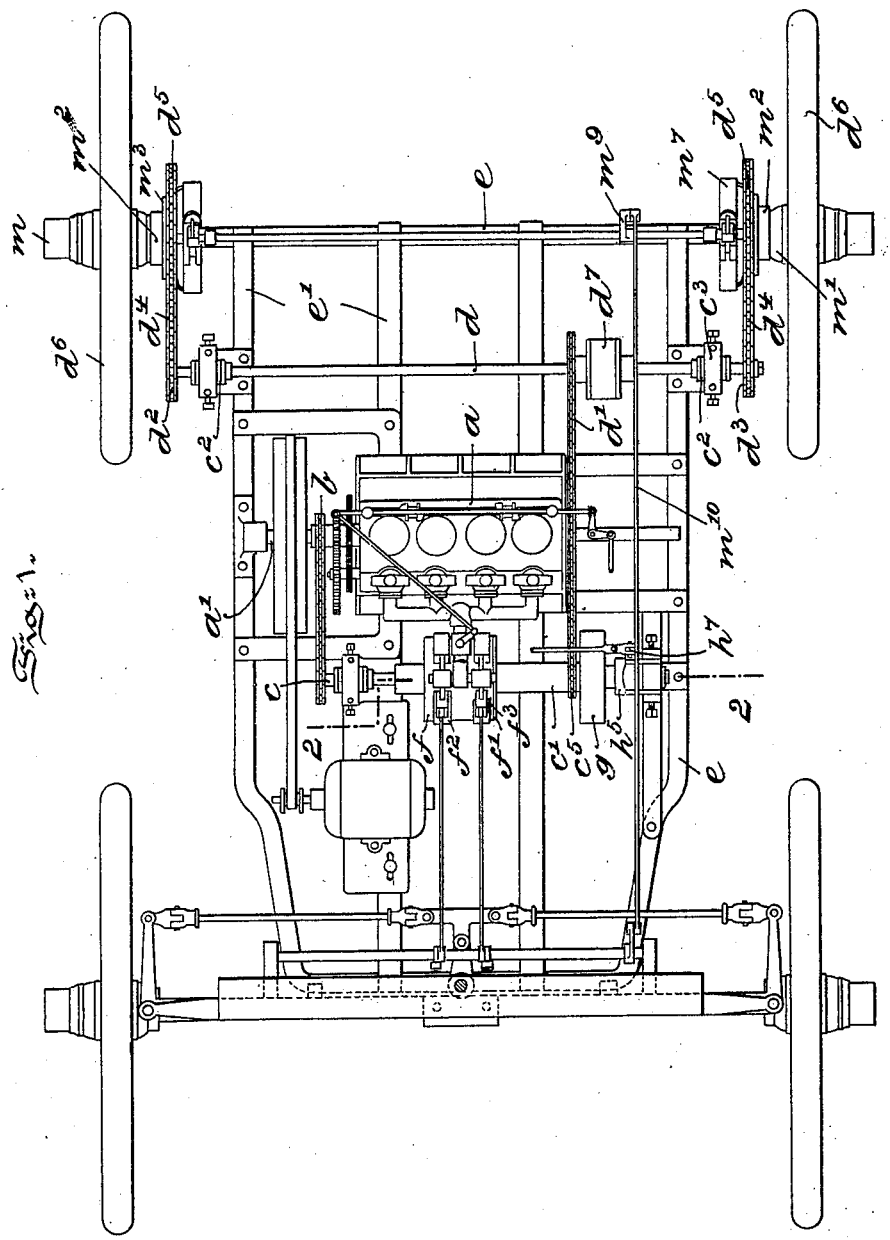

No. 700,786. Patented May 27, 1902.
A. L. KULL.
DRIVING MECHANISM FOR AUTOMOBILES.
(Application filed Apr. 2, 1901. Renewed Dec. 9, 1901.)
(No Model.) 2 Sheets—Sheet 2.
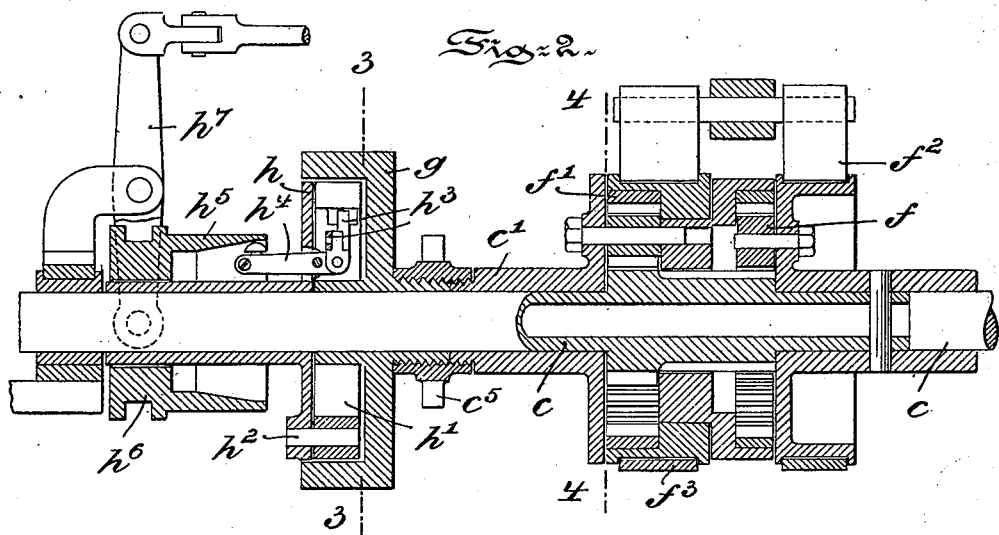
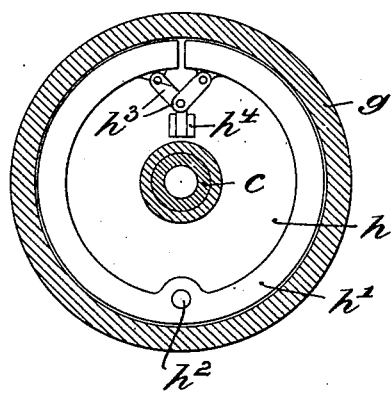
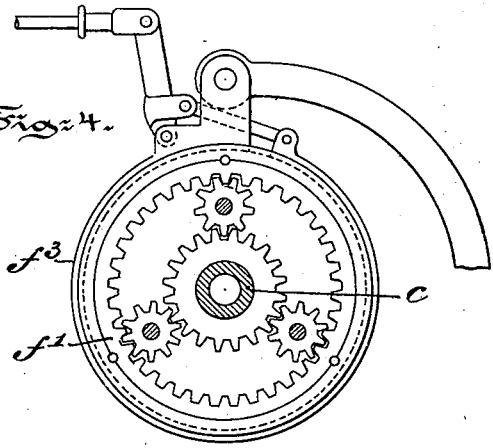
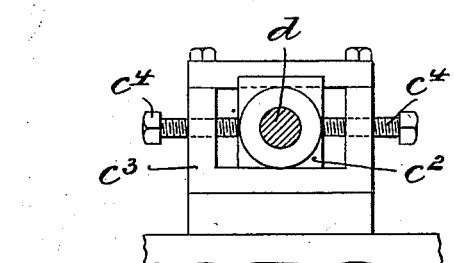
Witnesses:
Wilhelm Vogt
Thomas M. Smith.
Inventor:
Albert L. Kull,
by J. Walter Douglass
Attorney.

UNITED STATES PATENT OFFICE.

ALBERT L. KULL, OF CAMDEN, NEW JERSEY.

DRIVING MECHANISM FOR AUTOMOBILES.

SPECIFICATION forming part of Letters Patent No. 700,786, dated May 27, 1902.

Application filed April 2, 1901. Renewed December 9, 1901. Serial No. 85,252. (No model.)

*To all whom it may concern:*

Be it known that I, ALBERT L. KULL, a citizen of the United States, residing at Camden, in the county of Camden and State of New Jersey, have invented certain new and useful Improvements in Driving Mechanism for Automobiles, of which the following is a specification.

My invention has relation to the driving mechanism for automobiles and similar vehicles; and in such connection it relates to the construction and arrangement of the parts comprising the driving mechanism.

The nature and scope of my invention will be more fully understood from the following description when taken in connection with the accompanying drawings, forming part hereof, in which—

Figure 1 is a top or plan view of the frame, running-gear, and driving mechanism of an automobile embodying main features of my invention. Fig. 2 is an enlarged cross-sectional view on the line 2 2 and illustrating the means for regulating the speed of the vehicle. Fig. 3 is a vertical sectional view on the line 3 3 of Fig. 2. Fig. 4 is a similar view on the line 4 4 of Fig. 2. Figs. 5 and 6 are enlarged detail views of one of the adjustable bearings for the driven shaft.

Referring to the drawings, $a$ represents the engine, having a driving-shaft $a'$, adapted to drive, through a sprocket-and-chain connection $b$, the driven shaft $c$. The shaft $c$ drives an intermediate shaft $d$ through a sprocket-and-chain connection $d'$. At either end of the intermediate shaft $d$ are secured the sprocket-wheels $d^2$ and $d^3$, which transmit, through the chains $d^4$, the motion of the shaft $d$ to the sprocket-wheels $d^5$, secured to the hubs of the rear or driving wheels $d^6$ of the vehicle, as hereinafter more particularly described. The shaft $d$ is provided with the usual compensating-gear mechanism (not shown) and inclosed in the housing $d^7$. The axle $e$ for the wheels $d^6$ of the vehicle is stationary, and the framework $e'$ is directly secured to the axle $e$, which thus forms part of the frame and imparts great strength and rigidity thereto. The shaft $d$ is carried at either end in a bearing-block $c^2$, slidable in a box $c^3$ and adapted to be adjusted in said box by means of adjusting-screws $c^4$, as clearly illustrated in Figs. 5 and 6. The shaft $d$ is likewise or similarly supported in adjustable bearing-blocks, and thus both shafts may be readily and quickly adjusted to take up the slack in the chain connection $b$, in the chain connection $d'$, or in the chains $d^4$. This easy manner of adjustment is a valuable feature in vehicles of this class, where stoppages are frequently due to the loosening of the chain connections.

The means for regulating the speed of the vehicle consists, preferably, of the following arrangement of parts: Upon the shaft $c$ is arranged a speed changing and reversing gear mechanism $f$ and $f'$ of well-known construction, which is connected with a sleeve $c'$, carrying the sprocket-wheel $c^5$, which drives the chain $d'$. Referring now to Figs. 2 and 3, this sleeve $c'$ carries a housing $g$, inclosing a disk $h$, which is fixed to the shaft $c$, and to the disk $h$ a split ring $h'$ is secured by a bolt $h^2$. The free ends of the ring $h'$ are connected to the toggle-levers $h^3$, which are pivoted to and adapted to be advanced or retracted by a lever-arm $h^4$. The free end of the lever-arm $h^4$ extends into and engages the interior conical surface of a tubular extension $h^5$, which projects from a grooved collar $h^6$, adapted to be engaged by a forked clutch $h^7$ under the control of the operator and adapted to shift the tubular extension $h^5$ toward or away from the free end of the arm $h^4$. When the tubular extension $h^5$ is shifted inward toward the arm $h^4$, the free end of said arm is depressed and the toggle-levers are advanced to clamp the ring $h'$, carried by the disk $h$, to the housing $g$. When thus clamped together, the shaft $c$ transmits its motion directly to the housing $g$ and sprocket-wheel $c^5$, and the shaft $d$ is therefore driven directly by the said shaft $c$. Of course it will be readily understood that when the shaft $d$ is to be thus driven the speed changing and reversing gear mechanism $f$ and $f'$ is thrown out of operation by releasing the band $f^2$ or $f^3$, which controls the mechanism $f$ or $f'$.

Having thus described the nature and object of my present invention, what I claim as new, and desire to secure by Letters Patent, is—

In an automobile, a shaft driven directly by the main driving-shaft, a sleeve surrounding the driven shaft, a sprocket-wheel secured to said sleeve, a housing carried by said sleeve, a disk carried by the driven shaft, a split ring secured to said disk, and extending within the housing, a toggle connection between the free ends of said ring and means for expanding said toggled connection to clamp the band and disk to the housing, substantially as and for the purposes described.

In testimony whereof I have hereunto set my signature in the presence of two subscribing witnesses.

ALBERT L. KULL.

Witnesses:
J. WALTER DOUGLASS,
THOMAS M. SMITH.